United States Patent [19]

May et al.

[11] Patent Number: 5,671,034
[45] Date of Patent: Sep. 23, 1997

[54] POLARISATION DEPENDENT REFRACTIVE DEVICE EXHIBITING INDEPENDTLY VARYING FIRST AND SECOND INDICES OF REFRACTION AND METHODS OF MANUFACTURE THEREOF

[75] Inventors: Paul May, Cambridge; Kathryn Walsh, Reading; Gillian Margaret Davis, Oxfordshire, all of United Kingdom

[73] Assignee: Sharp Kabushiki Kaisha, Osaka, Japan

[21] Appl. No.: 525,917

[22] Filed: Sep. 7, 1995

[30] Foreign Application Priority Data

Sep. 9, 1994 [GB] United Kingdom .................. 9418251

[51] Int. Cl.⁶ ........................................... G02F 1/137
[52] U.S. Cl. ........................ 349/200; 359/494; 359/653
[58] Field of Search ............................. 359/494, 94, 95, 359/653; 349/201, 200

[56] References Cited

U.S. PATENT DOCUMENTS

| | | |
|---|---|---|
| 2,256,093 | 9/1941 | Land . |
| 3,423,196 | 1/1969 | Olson . |
| 3,447,857 | 6/1969 | McCartney . |
| 4,795,246 | 1/1989 | Lord ............................................. 359/494 |
| 5,105,298 | 4/1992 | Schellenberg . |

FOREIGN PATENT DOCUMENTS

| | | |
|---|---|---|
| 0311339 | 4/1989 | European Pat. Off. . |
| 0349144 | 1/1990 | European Pat. Off. . |
| 0349309 | 1/1990 | European Pat. Off. . |
| 0525473 | 2/1993 | European Pat. Off. . |
| 62-189427 | 8/1987 | Japan ........................................ 359/94 |
| 6-194521 | 7/1994 | Japan ........................................ 359/94 |

OTHER PUBLICATIONS

Yakolev et al, "New Concept to Achieve Color LDCs with Linearly Photopolymerized LCD–Substrates", Saratov State Univ., LCT–4, pp. 17–20, (1993).

Shi et al, "Large Photoinduced Birefringence in an Optically Nonlinear Polyester Polymer", Appl. Phys. Lett. 59 (23), 2 Dec. 1991, pp. 2935–2937.

Search Report for U.K. Appl. 9418251.6, mailed Dec. 5, 1994.

O'Brien et al, "Generalised Dynamic Holographic Interconnects Using Spatial Light Modulators", OSA Tech. Digest, vol. 6, Mar. 15–17, 1993, Palm Springs, CA.

Schadt et al, "Surface–Induced Parallel Alignment of Liquid Crystals by Linearly Polymerized Photopolymers," Jpn. J. Appl. Phys., vol. 31 (1992), pp. 2155–2164, Part 1, No. 7, Jul. 1992.

Eurodisplay '93; 1993; Strasbourg, France; pp. 17–20; XP000613284; D.A. Yakolev, et al. "New Concept to Achieve Color LCDs with Linearly Photopolymerized (LPP) LCD–Substrates".

Primary Examiner—William L. Sikes
Assistant Examiner—James A. Duclek

[57] ABSTRACT

A birefringent element is patterned such that for light of a first polarisation the element acts as a first refractive optical element and for light of a second polarisation the optical response of the element changes. The element can be used in conjunction with a polarisation selecting means, such as a liquid crystal device, to provide an electrically controllable optical element that can be used in light beam manipulation applications.

26 Claims, 3 Drawing Sheets

SPATIALLY VARYING REFRACTIVE INDEX $n_y$
LENGTH OF ARROW = MAGNITUDE OF REFRACTIVE INDEX

SPATIALLY CONSTANT REFRACTIVE INDEX $n_x$
LENGTH OF ARROW = MAGNITUDE OF REFRACTIVE INDEX

POLARISATION DEPENDENT REFRACTIVE DEVICE EXHIBITING INDEPENDTLY VARYING FIRST AND SECOND INDICES OF REFRACTION AND METHODS OF MANUFACTURE THEREOF

The present invention relates to a polarisation sensitive refractive device and to a method of manufacturing such a device. Such a device is suitable for use in optical storage, optical computing, beam steering and printing applications.

D. C. O'Brien, T. D. Wilkinson, R. J. Mears, and W. A. Crossland, in a paper entitled "Generalised dynamic holographic interconnects using spatial light modulators", Light modulators and applications, OSA meeting, Palm Springs, March 1993, disclose a computer generated hologram using a ferroelectric liquid crystal spatial light modulator (SLM) to provide binary phase modulation. The SLM is illuminated with a collimated beam of light, and the light emerging from the SLM is transformed using a lens so as to replay the hologram. The phase changes provided by the SLM form the hologram. In order to replay relatively complex holograms, and especially holograms having irregular dot patterns, each element of the SLM needs to be addressed in parallel. This may impose severe pin out requirements on the SLM and result in bulky systems. The holograms may be used to steer light beams.

Polarisation sensitive photopolymers may be used to form relatively complex retarder patterns, as reported by M. Schadt, K. Schmitt, V. Kozinkov and V. Chigrinov "Surface-induced parallel alignment of liquid crystals by linearly polymerised photopolymers" Jap journal of applied physics. Vol 31(1992) p2155–2164 and D. A. Yakolev, G. V. Simonenko, V. M. Kozenkov, V. G. Chigrinov and M. Schadt, "New Concept to Achieve Color LCDs with Linearly Photopolymerised (LPP) LCD-Substrates" in a paper presented to Eurodisplay 93, Strasbourg. Optical writing of retarder patterns can be used to produce high resolution, but non reconfigurable, retarders.

Y. Shi, W. H. Steier, L. Y. Mai (Chen, and L. R. Dalton, "Large photoinduced birefringence in optically non-linear polyester polymer", Applied Physics letters 59(23) December 1991, p2935–2937 describe the formations of birefringent gratings in a trans-cis photoisomerisable dye in a polyester polymer material.

According to a first aspect of the present invention there is provided a polarisation dependent refractive device, comprising a birefringent element having a first refractive index to light polarised along a first direction, which first refractive index varies as a first function of position, and a second refractive index to light polarised along a second direction, which second refractive index is a second function of position different to the first function.

It is thus possible to provide an optical element whose properties vary in accordance with the polarisation of light incident thereon. As used herein the terms "optical" and "light" are used in an extended sense to cover the infra-red, visible and ultra-violet regions of the electromagnetic spectrum.

Preferably a liquid crystal device (LCD) is provided for switching the polarisation of light incident on the birefringent element between the first direction and the second direction. Thus the polarisation of light incident on the LCD may be selected or rotated by the LCD so as to provide an electrically controllable device.

Advantageously the first and second directions are orthogonal.

The spatial variation of refractive index to light polarised along the first direction may be such that the birefringent element functions as a lens. On the other hand, the spatial variation of refractive index may be substantially uniform to light polarised along the second direction, such that the birefringent element has substantially no focusing effect on light polarised along the second direction.

The magnitude of the birefringent effect may be enhanced by arranging for the light to undergo multiple passes through the device. For example, the device may be arranged to work in a reflection mode and may have a reflector at or adjacent to a surface of the birefringent element. Thus light entering the birefringent element makes two passes through the element.

Preferably the birefringent element is divided into a plurality of individual regions and, when an LCD is provided, the LCD is pixellated such that at least one region of the birefringent element is associated with one or more pixels of the LCD.

Preferably the variation of refractive index to light polarised along one of the first and second directions across the birefringent element or, when divided into a plurality of regions, across each region is a smooth function of position. Advantageously the refractive index continuously changes.

The birefringent element having a spatially varying birefringence may be produced by optically inducing birefringence in photosensitive polarisation sensitive polymers, such as polyvinyl 4-methoxy-cinnamate (PVMC) as disclosed by Schadt et al, or in photoisomerisable dye doped polymer such as PE-DR19 as described by Shi et al. Spatially varying birefringence may be achieved by illuminating the photosensitive material with a substantially uniformly intense polarised recording radiation in which the direction of polarisation is spatially varying. Alternatively the direction of polarisation may be kept constant and the intensity of the recording radiation may be spatially amplitude modulated.

Alternatively a definable variation in birefringence may be provided by ion exchange within non-centrosymmetric crystals, such as lithium niobate.

The element may alternatively be produced by irradiating a cell or film of an aligned photosensitive liquid crystal monomer or polymer to partially polymerize or cross-link the liquid crystal, the radiation being of spatially varying intensity so as to vary the extent of polymerization or cross-linking. The alignment of the liquid crystal material is then altered, for example by heating the liquid crystal material to the isotropic phase or alternatively by applying an electric field across the cell, in both cases then irradiating the cell with uniform intensity radiation to fully polymerizer or cross-link the material.

It thus possible to provide a polarisation dependent refractive optical device which has plane surfaces. The planar nature of the device allows a plurality of devices to be stacked together.

According to a second aspect of the present invention, there is provided a method of making a polarisation dependent refractive device, comprising exposing a photosensitive material exhibiting photoinduced birefringence to polarised light spatially modulated in accordance with a predetermined pattern.

According to a third aspect of the present invention, there is provided a method of making a polarisation dependent refractive device, comprising forming a spatially varying ion concentration within a material exhibiting birefringence as a function of ion concentration.

Preferably the material is a non-centrosymmetric crystal. Advantageously the material is lithium niobate or lithium tantalate.

A graded concentration profile can be formed by lateral diffusion at elevated temperatures. Alternatively the material may be masked using a mask having a spatially variable permeability to ions. Ion exchange can be performed by bringing a surface of the material into contact with an acid.

According to a further aspect of the invention there is provided a method of making a polarization dependent refractive device, comprising irradiating a cell of an aligned photosensitive liquid crystal monomer or polymer with radiation of spatially varying intensity, changing the liquid crystal alignment, and subsequently irradiating the cell with radiation of uniform intensity preferably to completely fix the liquid crystal material.

The method may further comprise at least one further stage comprising the steps of realigning the liquid crystal and irradiating the cell, the at least one further stage occuring prior to the steps of changing the liquid crystal alignment and subsequently irradiating the cell with radiation of uniform intensity.

The present invention will further be described, by way of example, with reference to the accompanying drawings, in which.

Figure 2A:
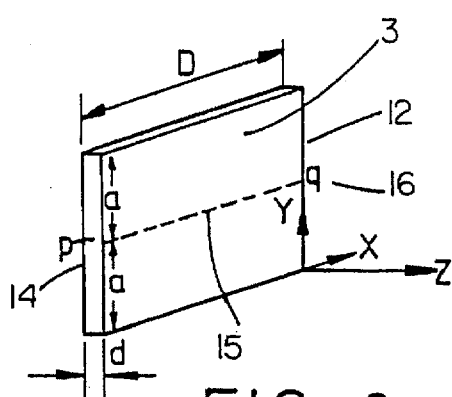
FIG. 2a is a perspective view of a section of a birefringent element constituting an embodiment of the present invention.
Figure 2B:
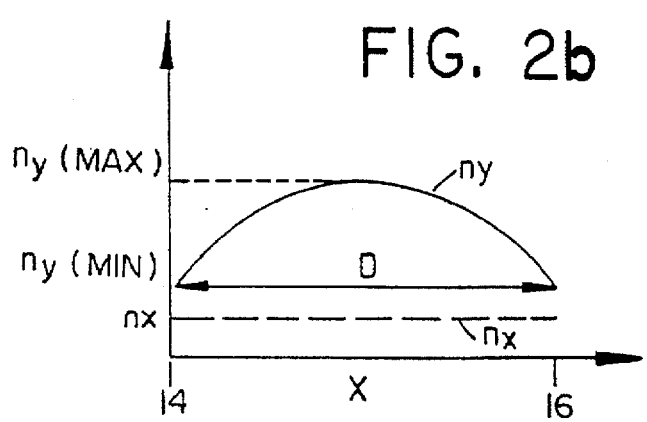
Figure 3A:
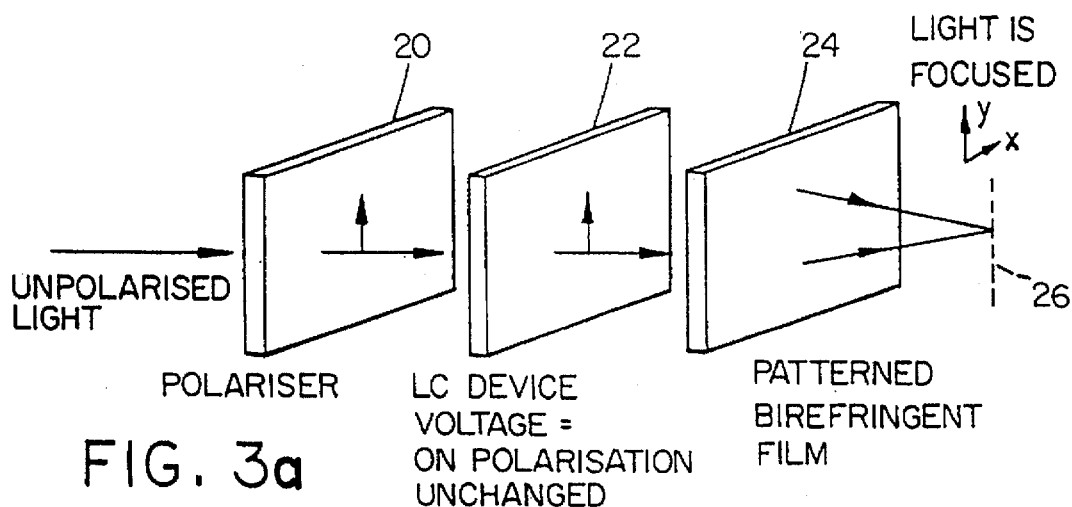
Figure 3B:
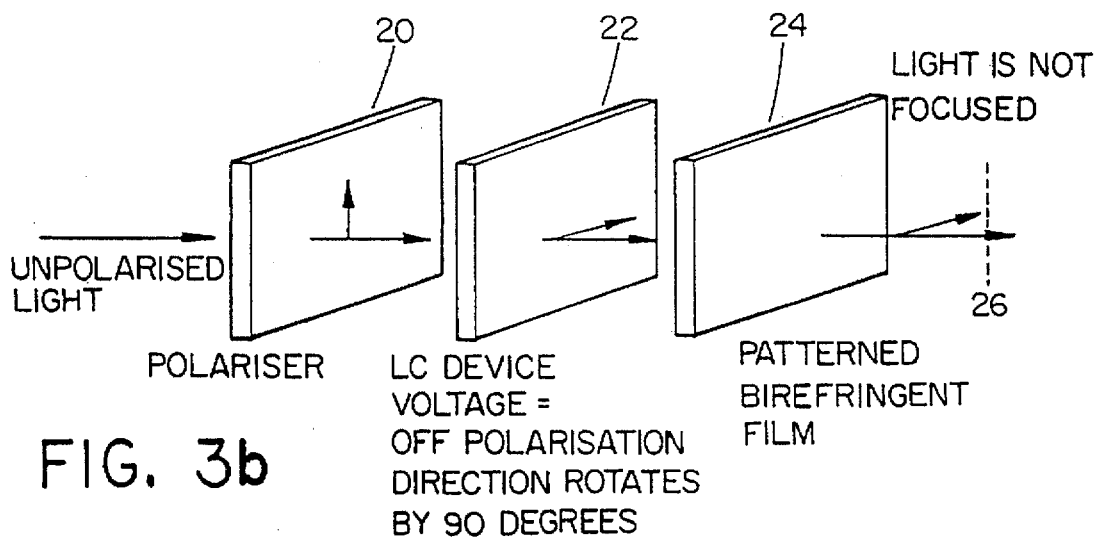
Figure 4A:
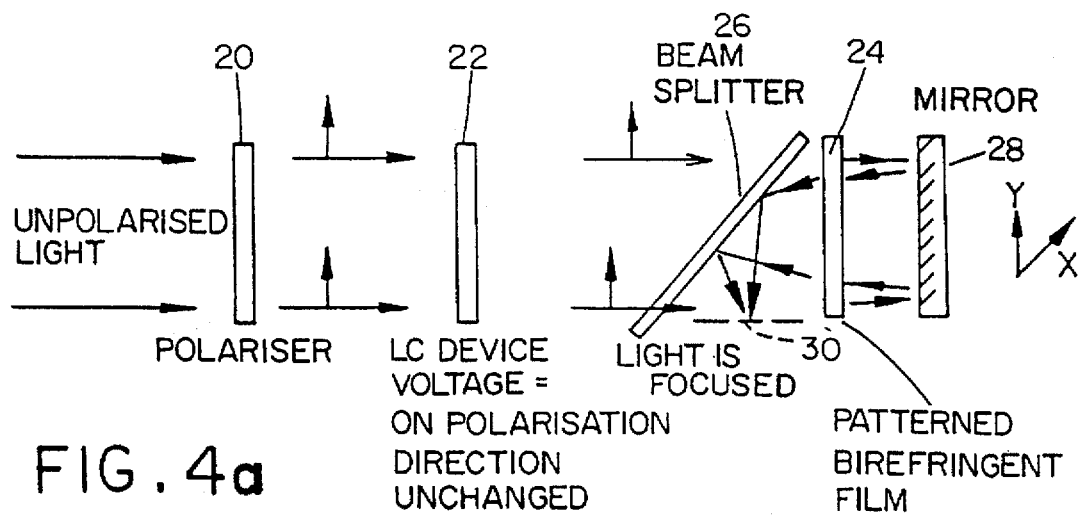
Figure 4B:
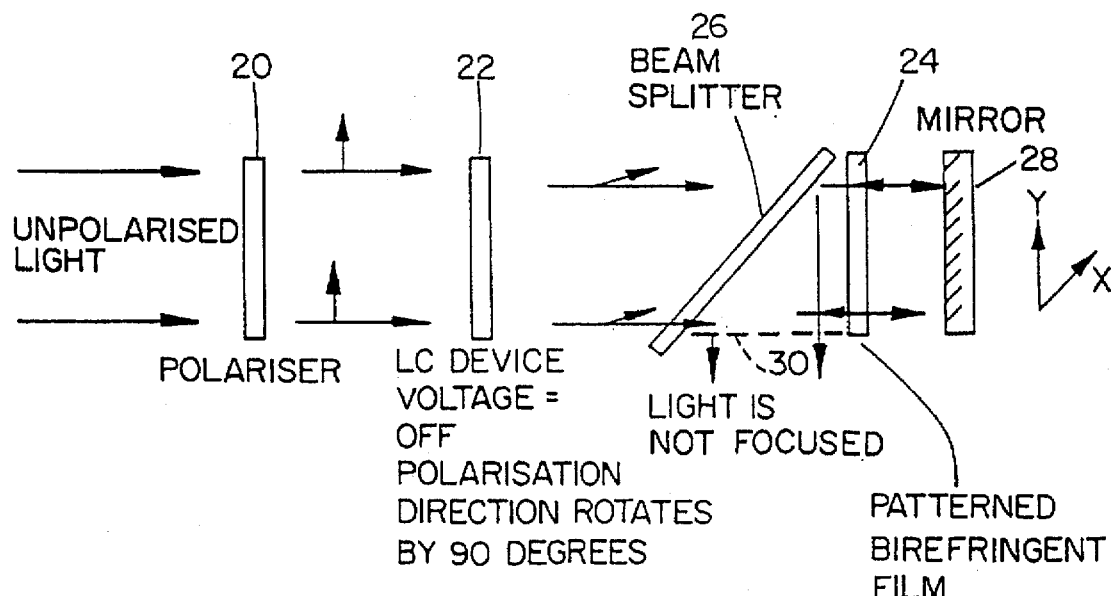

FIG. 2b schematically illustrates the spatial variation of refractive indices $n_x$ and $n_y$ with respect to displacement along the line p–q in the x direction within the element shown in FIG. 2a;

FIGS. 3a and 3b schematically illustrate the operation of an embodiment of the present invention; and FIGS. 4a and 4b schematically illustrate the operation of a further embodiment of the present invention.

Figure 5:
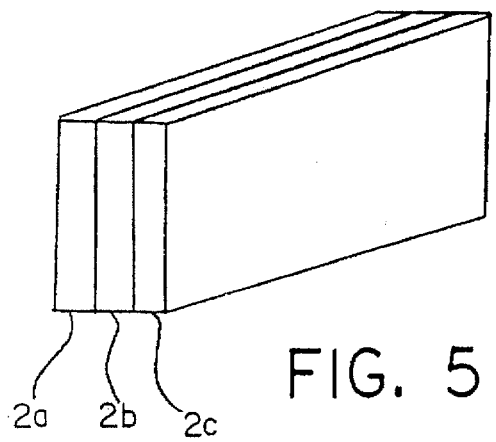

FIG. 5 is a perspective view of a plurality of the polarisation dependent refractive optical devices stacked together according to another embodiment of the present invention.

Figure 1A:
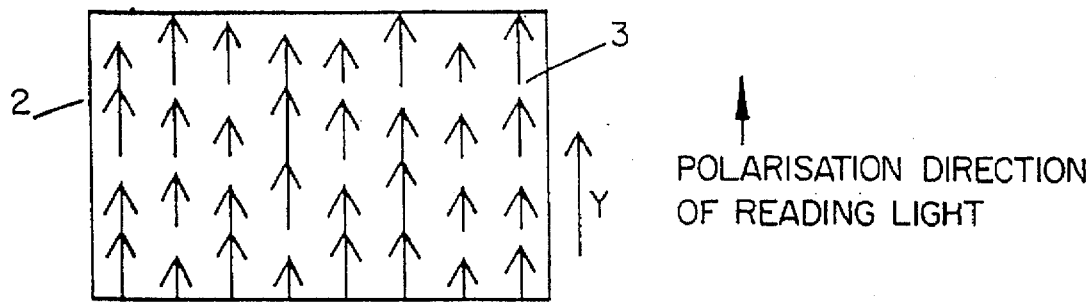
FIGS. 1a and 1b are schematic diagrams illustrating the spatial variation of refractive index to light polarised in first and second mutually orthogonal directions, respectively, in a birefringent element constituting an embodiment of the present invention.
Figure 1B:
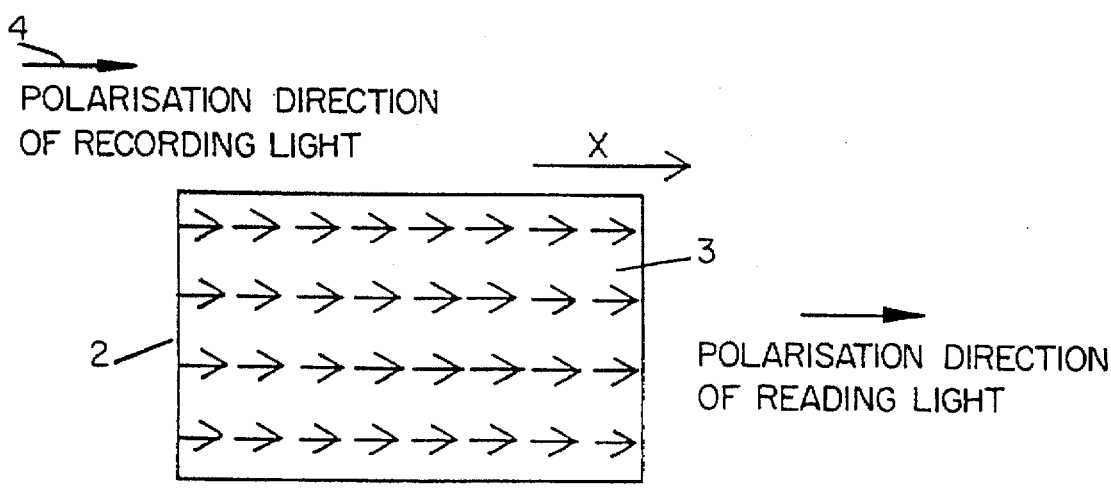

FIGS. 1a and 1b schematically illustrate the spatial variation of refractive index of a patterned birefringent element 2 to light polarised along two perpendicular directions parallel to a surface 3 of the device and labelled Y and X, respectively. The length of each arrow in the element represents the magnitude of the refractive index at the point of the element 2 at the tip of that arrow. The element 2 has a continuously spatially varying refractive index to light polarised along the Y direction, whereas the refractive index is substantially invariant to light polarised along the X direction.

The element 2 is produced by exposing a photopolymer such as PVMC to a linearly polarised record light whose intensity is modulated in accordance with the pattern of refractive index changes that is to be induced in the photopolymer. Irradiating the photopolymer with the record light aligned with the X direction, as indicated by the arrow 4, causes changes in the refractive index along the Y direction of the material which are related to the intensity distribution of the record light. The refractive index along the X direction is substantially unaffected. There is substantially no variation in refractive index along a Z direction perpendicular to both the X and Y directions. If a different material is used, irradiating the material with light polarised along the Y direction may cause changes in refractive index to Y polarised light to be written into the material.

The element 2 may alternatively be produced by irradiating an aligned photosensitive liquid crystal monomer or polymer cell or film. The intensity of the radiation is spatially varying so as to vary the extent to which the liquid crystal monomer is polymerized or the extent of crosslinking of the liquid crystal polymer at each point in the cell. The cell is then heated to the isotropic phase in order to alter the refractive indices of the areas of the cell or film which are not fully polymerized or cross-linked. The liquid crystal is then irradiated uniformly until it is fully polymerized or cross-linked. Alternatively, rather than heating the cell, an electric field may be applied to the cell to alter the alignment and hence the refractive indices of those parts of the liquid crystal which are not fully cross-linked or polymerized. In this orientation, the cell is uniformly irradiated to fully polymerize or cross-link the liquid crystal. Elements produced in this way have the advantage that they are not sensitive to UV light and a larger birefringence can be induced than can be achieved in materials which exhibit photo induced birefringence.

In order to form a polarisation dependent refractive element, such as a converging lens, a region having a continuously varying refractive index is formed in the element 2. FIG. 2b shows the variations in refractive indices $n_y$ and $n_x$ with respect to displacement along the line p–q in the X direction of the element 12 shown in FIG. 2a. The refractive index $n_y$, to light polarised along the Y direction varies smoothly with displacement along the X direction from a minimum $n_y(min)$ at position p at one edge 14 of the element 12, through a maximum $n_y(max)$ at the centre 15 of the element to the minimum $n_y(min)$ at position q at another edge 16 of the element 12. The focal length of such a lens depends on the width D of the element, the thickness d of the element and the difference between the values of $n_y(max)$ and $n_y(min)$. The focal length $F_y$ of such a lens is approximately described by:

$$F_y = D^2/(8 \cdot \Delta n_y \cdot d) \quad (1)$$

where $$\Delta n_y = n_y(max) - n_y(min).$$

Thus with an element width D of 0.1 mm, a thickness d of 5 microns, a maximum refractive index $n_y(max)$ of 1.55 and a minimum refractive index $n_y(min)$ of 1.50, a lens having a focal length of 5 mm is formed.

The refractive index $n_x$ to light polarised along the X directions is substantially constant and there is no focusing action in respect of light polarised along the X direction.

Each element 12 can be a lens (converging or diverging) or other refractive element within a plurality of refractive elements formed in the birefringent element 2. The refractive elements may be microprisms or micropyramids (or have optical properties which approximate microprisms or micropyramids) or elements of a Fresnel lens.

FIGS. 3a and 3b illustrate the operation of a beam manipulation apparatus. A polariser 20 and a liquid crystal device 22 are arranged to modify the polarisation of light incident on the patterned birefringent element 24. The element 24 is of the type described with reference to FIG. 2 and is arranged to focus light polarised along the Y direction (as indicated in FIG. 3a) to a focal plane 26. The polariser 20 is arranged to polarise light incident thereon along the Y direction. Light from the polariser passes via the LCD 22 to the patterned birefringent element 24. The LCD 22 is arranged such that, when a voltage is applied across it, the polarisation of the light passing therethrough is unchanged.

However, when no voltage is applied to the LCD, it rotates the plane of polarisation of the polarised light by 90 degrees so that the light becomes polarised along the X direction. Thus when a voltage is applied to the LCD 22 via electrodes (not shown), the light passing through the element 24 is polarised in the Y direction and consequently is brought to a focus in the focal plane 26. When no voltage is applied to the LCD 22 (FIG. 3b), the light passing through the element 24 is polarised in the X direction and is consequently not brought to a focus in the focal plane 26.

FIGS. 4a and 4b show a further beam manipulation apparatus which includes a reflector. The basic operation of the device is similar to that described with reference to FIGS. 3a and 3b, and like reference numerals refer to like parts.

A beam splitter 26 is interposed between the liquid crystal device 22 and the patterned birefringent element 24. A mirror 28 is located adjacent the birefringent element so as to reflect light transmitted by the birefringent element 24 back towards the element 24.

As shown in FIG. 4a, when the liquid crystal device 22 is switched on, light polarised along the Y direction is partially transmitted, via the beam splitter 26 to the patterned birefringent element 24. The light interacts with the refractive element formed in the element 24, light emerging from the element 24 is reflected by the mirror 28 and passes through the element 24 a second time where it interacts further with the refractive element formed in the birefringent element 24. The light is then partially directed by the beam splitter 26 to a focal plane 30.

When the liquid crystal device 22 is switched off, it rotates the plane of polarisation of the incident Y polarised light by 90 degrees so that the transmitted light is polarised along the X direction, as shown in FIG. 4b. Light polarised in the X direction does not see a focusing element formed within the birefringent element 24, and hence passes to the mirror 28 without undergoing a focusing action. Similarly light reflected from the mirror 28 passes, via the birefringent element 24, to the beam splitter 26 without undergoing focusing. Thus the light is not brought to a focus in the focal plane 30.

It is thus possible to provide a birefringent element having spatially varying refractive index with respect to light polarised along one or more directions. Such an element can be included within an electrically controllable device for manipulating a light beam.

FIG. 5 illustrates an embodiment including a plurality of the polarisation dependent refractive optical devices stacked together. The planar nature of the devices, respectively identified as 2a thru 2c, allows the devices to be stacked together.

What is claimed is:

1. A polarisation dependent refractive device, comprising a birefringent element having a first refractive index to light polarised along a first direction, which first refractive index varies as a first function of position, and a second refractive index to light polarised along a second direction, which second refractive index is a second function of position, at least one of the second refractive index and the second function being different to the respective one of the first refractive index and the first function, and wherein the second function is an indedendent function of the first function.

2. A device as claimed in claim 1, in which the second function is a constant function so that the second refractive index is substantially constant with respect to position.

3. A device as claimed in claim 1, in which the first and second directions are mutually orthogonal.

4. A device as claimed in claimed in claim 1, in which at least one of the first and second functions is a continuous function.

5. A device as claimed in claim 1, in which at least one portion of the birefringent element is arranged to simulate a lens for light polarised along the first direction and to have substantially no focusing effect on light polarised along the second direction.

6. A device as claimed in claim 1, in which at least one portion of the birefringent element is arranged to simulate a prism, a microprism or a micropyramid for light polarised along one of the first and second directions and to have different optical properties to light polarised along the other of the first and second directions.

7. A device as claimed in claim 1, further comprising at least one reflector for reflecting light back through the birefringent element.

8. A device as claimed in claim 1, further comprising a liquid crystal device for switching the polarisation of light incident on the birefringent element between the first direction and the second direction.

9. A device as claimed in claim 8, further comprising a polariser for polarising light incident on the liquid crystal device.

10. A device as claimed in claim 1, in which a plurality of polarisation dependent refractive elements are formed within the birefringent element.

11. A device as claimed in claim 1, in which the device has a first surface for receiving light and in which the first refractive index is a function of position parallel to the first surface.

12. A device as claimed in claim 1, in which the device has first and second parallel surfaces.

13. A polarisation dependent refractive device comprising a plurality of devices as claimed in claim 12 arranged in a stack.

14. A device as claimed in claim 1, wherein the birefringent element includes plane surfaces.

15. A method of making a polarisation dependent refractive device, comprising exposing a photosensitive material exhibiting photo-induced birefringence to a polarized light beam spatially modulated in accordance with a predetermined pattern to form a birefringent element having a first refractive index to light polarised along a first direction, which first refractive index varies as a first function of position, and a second refractive index to light polarised along a second direction, which second refractive index is a second function of position, at least one of the second refractive index and the second function being different to the respective one of the first refractive index and the first function, and wherein the second function is an independent function of the first function.

16. A method as claimed in claim 15, in which the polarised light is amplitude modulated.

17. A method as claimed in claim 15, in which the exposure time to the polarised light is a function of position.

18. A method as claimed in claim 15, in which the direction of polarisation is spatially modulated.

19. A method of making a polarisation dependent refractive device, comprising forming a spatially varying ion concentration within a material exhibiting birefringence as a function of ion concentration to form a a birefringent element having a first refractive index to light polarised along a first direction, which first refractive index varies as a first function of position, and a second refractive index to light polarised along a second direction, which second refractive index is a second function of position, at least one of the second refractive index and the second function being different to the respective one of the first refractive index and the first function, and wherein the second function is an independent function of the first function.

20. A method as claimed in claim 19, in which the ions are diffused into the material.

21. A method as claimed in claim 19, in which a surface of material is masked and exposed to an acid.

22. A method of making a polarization dependent refractive device, comprising irradiating a cell of an aligned photosensitive liquid crystal monomer or polymer with radiation of spatially varying intensity, changing the liquid crystal alignment, and subsequently irradiating the cell with radiation of uniform intensity to form a a birefringent element having a first refractive index to light polarised along a first direction, which first refractive index varies as a first function of position, and a second refractive index to light polarised along a second direction, which second refractive index is a second function of position, at least one of the second refractive index and the second function being different to the respective one of the first refractive index and the first function, and wherein the second function is an independent function of the first function.

23. A method as claimed in claim 22, wherein the step of changing the liquid crystal alignment is effected by heating the liquid crystal to isotropic phase.

24. A method as claimed in claim 22, wherein the step of changing the liquid crystal alignment is effected by applying an electric field across the cell.

25. A method as claimed in claim 22, further comprising he additional steps of realigning the liquid crystal material and irradiating the cell before the steps of changing the liquid crystal alignment and irradiating the cell with radiation of uniform intensity.

26. A method as claimed in claim 22, wherein the step of irradiating the cell with radiation of uniform intensity completely polymerizes or fully cross-links the liquid crystal material.

* * * * *